US012716552B2

(12) United States Patent
Han et al.

(10) Patent No.: US 12,716,552 B2
(45) Date of Patent: Aug. 25, 2026

(54) LIQUEFIED HYDROGEN STORAGE TANK

(71) Applicant: KOREA GAS TECHNOLOGY CORPORATION, Daejeon (KR)

(72) Inventors: Jong Il Han, Daejeon (KR); Sang Bong Shin, Daejeon (KR); Seong Soo Park, Daejeon (KR); Min Ho Song, Daejeon (KR)

(73) Assignee: KOREA GAS TECHNOLOGY CORPORATION, Daejeon (KR)

( * ) Notice: Subject to any disclaimer, the term of this patent is extended or adjusted under 35 U.S.C. 154(b) by 128 days.

(21) Appl. No.: 18/510,189

(22) Filed: Nov. 15, 2023

(65) Prior Publication Data

US 2024/0230034 A1 Jul. 11, 2024

(30) Foreign Application Priority Data

Jan. 5, 2023 (KR) ........................ 10-2023-0001836
May 4, 2023 (KR) ........................ 10-2023-0058206

(51) Int. Cl.
*F17C 13/00* (2006.01)

(52) U.S. Cl.
CPC .... *F17C 13/001* (2013.01); *F17C 2201/0133* (2013.01); *F17C 2205/0134* (2013.01); *F17C 2205/0149* (2013.01); *F17C 2221/012* (2013.01); *F17C 2223/0161* (2013.01)

(58) Field of Classification Search
CPC ...... F17C 2201/0133; F17C 2205/0149; F17C 13/001; F17C 2205/0134; F17C 2221/012; F17C 2223/0161; Y02E 60/32
USPC .......................................... 220/560.04, 560.1
See application file for complete search history.

(56) References Cited

U.S. PATENT DOCUMENTS 3,221,916 A * 12/1965 Rysgaard ................ F17C 3/005 220/560.04
4,582,211 A * 4/1986 Mandel ................. B29C 53/588 220/62.19
2005/0132745 A1* 6/2005 Haberbusch ............ F25B 9/145 62/600
2015/0136789 A1* 5/2015 Nettis ....................... F17C 5/02 220/560.04

FOREIGN PATENT DOCUMENTS

KR 10-2144518 B1 8/2020
KR 102274184 B1 * 7/2021 ................ F17C 3/10

OTHER PUBLICATIONS

English Machine Translation of KR-102274184-B1 (Year: 2021).*

* cited by examiner

*Primary Examiner* — Laura E. Parker
(74) *Attorney, Agent, or Firm* — Bridgeway IP Law Group, PLLC; Jihun Kim

(57) ABSTRACT

The present disclosure relates to a liquefied hydrogen storage tank, and more specifically, to a liquefied hydrogen storage tank which facilitates transportation of the storage tank by manufacturing the storage tank storing liquefied hydrogen in a doughnut shape, can improve the robustness of the storage tank and reduce the weight thereof by forming a vacuum layer, improves the temperature maintenance performance of liquefied hydrogen through the shape allowing a second tank unit to surround a first tank unit, and improves thermal insulation through the coating layer.

3 Claims, 13 Drawing Sheets

LIQUEFIED HYDROGEN STORAGE TANK

CROSS-REFERENCE TO RELATED APPLICATION(S)

This application claims priority to Korean Patent Application No. 10-2023-0001836, filed on Jan. 5, 2023, and Korean Patent Application No. 10-2023-0058206 filed on May 4, 2023, the disclosure of which is incorporated herein by reference in its entirety.

TECHNICAL FIELD

The present disclosure relates to a liquefied hydrogen storage tank, and more specifically, to a liquefied hydrogen storage tank which facilitates transportation of the storage tank by manufacturing the storage tank storing liquefied hydrogen in a doughnut shape, can improve the robustness of the storage tank and reduce the weight thereof by forming a vacuum layer, improves the temperature maintenance performance of liquefied hydrogen through the shape allowing a second tank unit to surround a first tank unit, and improves thermal insulation through the coating layer.

DESCRIPTION OF THE RELATED ART

Hydrogen fuel is not only the most abundant element on Earth after carbon and nitrogen, but is also a clean energy source that produces only an extremely small amount of nitrogen oxides during combustion and does not emit any other pollutants at all. In addition, it can be produced using the abundant amount of water that exists on Earth as a raw material, and since it is recycled back to water even after use, it can be said to be an optimal alternative energy source without fear of depletion.

The most important challenge in using this hydrogen fuel is a method for storing hydrogen. The method for storing hydrogen includes a method for storing hydrogen by compressing a hydrogen gas, a method for storing hydrogen by liquefying the hydrogen gas, a method for storing hydrogen by using a hydrogen storage alloy, etc.

In particular, liquefied hydrogen has a compression performance of about 800 degrees compared to vaporized hydrogen, and considering the size of the hydrogen tank, ease of transportation, and economic efficiency, the method for storing hydrogen through liquefied hydrogen has been widely used in recent years.

At this time, liquefied hydrogen has a liquefaction temperature of −253° C. and vaporizes when the temperature rises so that the liquefied hydrogen storage tank should maintain a specific temperature in order to prevent vaporization of liquefied hydrogen, and insulation of the storage tank should be achieved indispensably.

Korean Patent No. 10-2144518 is an invention related to a liquefied hydrogen storage device, and shows an example of a liquefied hydrogen storage tank. However, in the case of a general tank form such as Korean Patent No. 10-2144518, there is a limitation in that a hydrogen tank has a large volume to make it difficult to transport the hydrogen tank, and there are limitations in that the temperature of liquefied hydrogen has a different non-uniformity at each point, and the insulation effect is insufficient.

RELATED ART DOCUMENT

Korean Patent No. 10-2144518

SUMMARY

The present disclosure provides a liquefied hydrogen storage tank, and more specifically, provides a liquefied hydrogen storage tank which facilitates transportation of the storage tank by manufacturing the storage tank storing liquefied hydrogen in a doughnut shape, can improve the robustness of the storage tank and reduce the weight thereof by forming a vacuum layer, improves the temperature maintenance performance of liquefied hydrogen through the shape allowing a second tank unit to surround a first tank unit, and improves thermal insulation through the coating layer.

According to the present disclosure, there is provided a liquefied hydrogen storage tank including: a doughnut-shaped first tank unit in which a hollow part is formed; and a second tank unit which has a doughnut shape having a hollow part formed therein and surrounds the first tank unit, wherein the first tank unit has liquefied hydrogen stored therein.

Further, in the liquefied hydrogen storage tank according to the present disclosure, the second tank unit includes: a 2-1 tank unit surrounding the outer surface of the first tank unit from the upper portion; and a 2-2 tank unit surrounding the outer surface of the first tank unit from the lower portion.

Furthermore, the liquefied hydrogen storage tank according to the present disclosure further includes an accommodation unit which is formed at one point on the outer surface of the 2-1 tank unit and in which a groove is formed; and a fixing unit which is formed at one point on the outer surface of the 2-2 tank unit and inserted into the groove, wherein the accommodation unit has a penetrated hole formed at one point on the upper side thereof, the fixing unit has a protruding pin formed at one point on the upper side thereof, and when the lower portion of the 2-1 tank unit and the upper portion of the 2-2 tank unit come into contact with each other, the fixing unit is inserted into the accommodation unit, and the pin is inserted into the hole at the same time.

Further, in the liquefied hydrogen storage tank according to the present disclosure, the second tank unit has a refrigerant stored therein.

Further, in the liquefied hydrogen storage tank according to the present disclosure, the second tank unit has a vacuum layer formed on the inner side thereof.

Further, in the liquefied hydrogen storage tank according to the present disclosure, the 2-1 tank unit has a pressurizing part protruding downward formed therein, the 2-2 tank unit has a tilting part capable of tilting formed therein, and when the pressurizing part pressurizes the tilting part, the tilting part is tilted so that the 2-1 tank unit and the 2-2 tank unit communicate with each, thereby forming a flow path which enables the refrigerant to circulate in the 2-1 tank unit and the 2-2 tank unit.

Further, in the liquefied hydrogen storage tank according to the present disclosure, the pressurizing part has pressurizing pins protruding in the vertical direction formed at the lower portion thereof, the tilting part has an auxiliary tilting part capable of tilting separately from the tilting part formed therein, and when the pressurizing part descends to tilt the tilting part, the pressurizing pins tilt the auxiliary tilting part.

Further, in the liquefied hydrogen storage tank according to the present disclosure, the pressurizing part has a predetermined slope, and the pressurizing pins are formed along the inclined surface.

Further, in the liquefied hydrogen storage tank according to the present disclosure, the pressurizing pins are formed in plural numbers and are disposed to be spaced apart at predetermined intervals along the inclined surface.

According to the present disclosure, there is an effect of improving the transportability of liquefied hydrogen by implementing the storage tank in a doughnut shape.

In addition, the heat exchange efficiency can be maximized by forming a structure in which the first tank unit having liquefied hydrogen stored therein is surrounded by the second tank unit having the refrigerant stored therein.

Additionally, the cost and weight can be reduced by forming the vacuum layer.

In addition, the heat exchange efficiency can be maximized by allowing the first tank unit and the refrigerant storage space of the second tank unit to communicate with each other.

In addition, there is an effect of improving the coupling support properties of the first tank unit and the second tank unit through the configuration of the accommodation unit and the fixing unit.

Additionally, the refrigerant circulation properties can be increased by securing multiple flow paths.

In addition, there is an effect of maximizing the insulating effect by the configuration of the heat insulation coating layer.

DESCRIPTION OF SPECIFIC EMBODIMENTS

The following content merely illustrates the principles of the invention. Therefore, a person skilled in the art can invent various devices that embody the principles of the present disclosure and are included in the concept and scope of the present disclosure, although not clearly described or shown in the present specification. In addition, all conditional terms and embodiments listed in the present specification are, in principle, apparently intended only for the purpose of enabling the concept of the present disclosure to be understood, and should be understood not as limiting to the embodiments and states specifically listed as such.

Additionally, it is to be understood that any detailed description enumerating not only the principles, viewpoints, and embodiments of the present disclosure, but also specific embodiments, is intended to encompass structural and functional equivalents such matters. In addition, these equivalents should be understood to include not only currently known equivalents but also equivalents to be developed in the future, that is, all elements invented to perform the same function regardless of structure.

The above-described objects, features and advantages will become clearer through the following detailed description related to the accompanying drawing, and accordingly, those skilled in the art to which the present disclosure pertains will be able to easily implement the technical idea of the present disclosure. Additionally, if it is determined that a detailed description of known technologies related to the present disclosure may unnecessarily obscure the gist of the present disclosure in describing the present disclosure, the detailed description will be omitted.

Hereinafter, various embodiments of the present disclosure will be described in detail with reference to the accompanying drawing.

Figure 1:
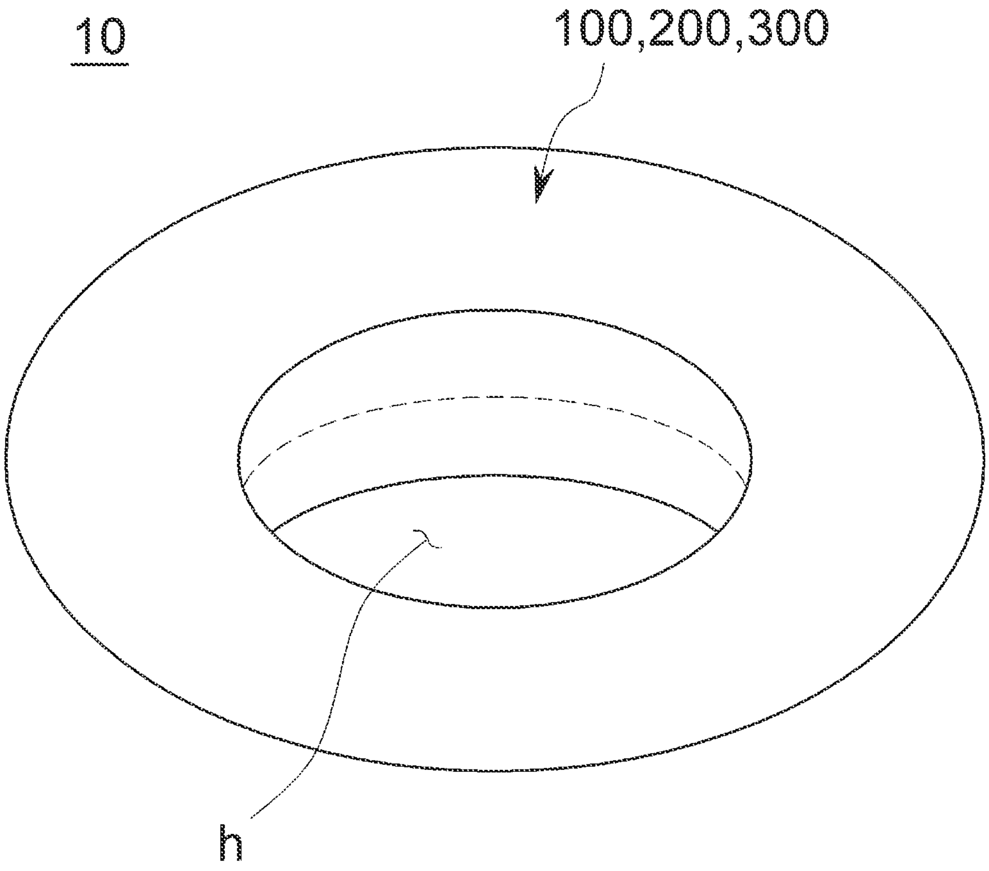
FIG. 1 shows an appearance of a liquefied hydrogen storage tank according to the present disclosure.
Figure 2:
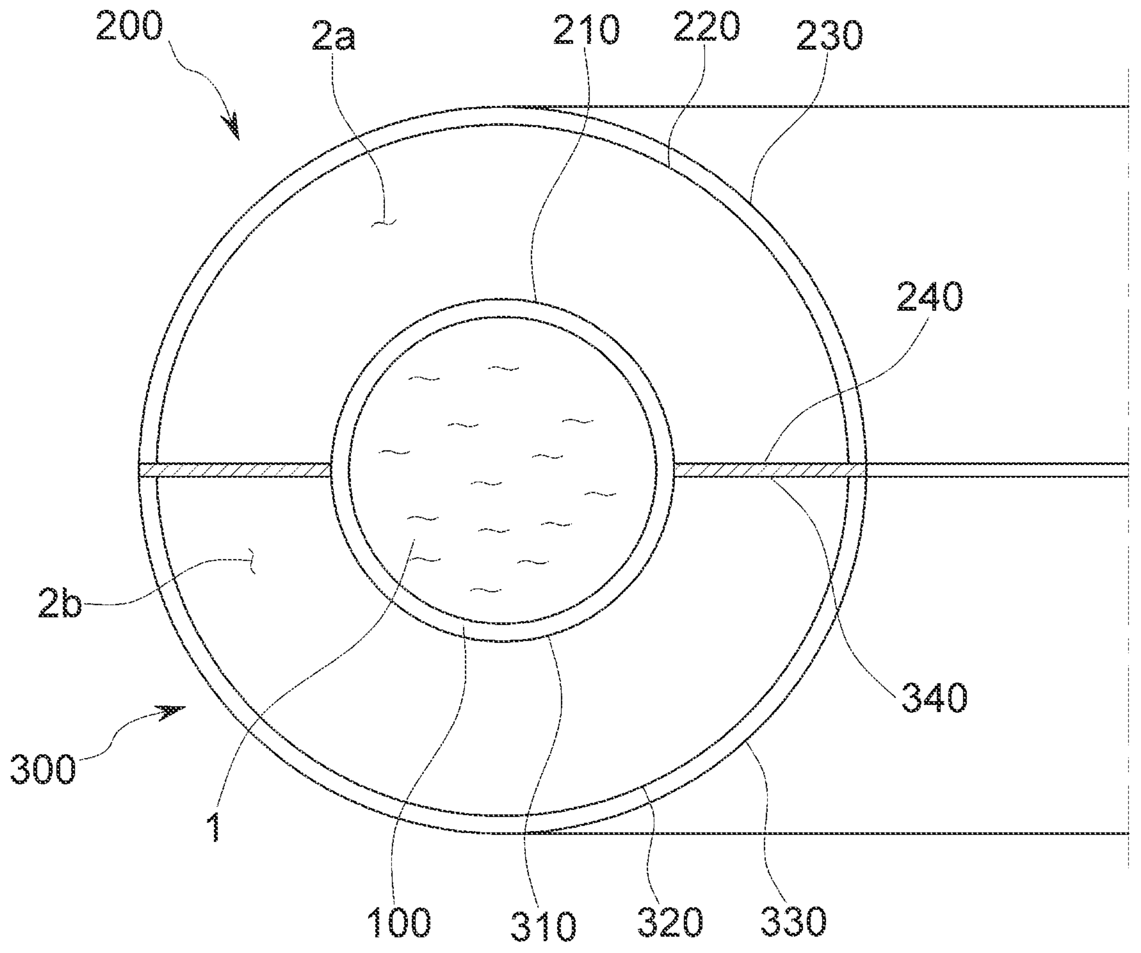
FIG. 2 shows a portion of a cross section of the liquefied hydrogen storage tank according to the present disclosure.

FIG. 1 shows an appearance of a liquefied hydrogen storage tank according to the present disclosure, and FIG. 2 shows a portion of a cross section of the liquefied hydrogen storage tank according to the present disclosure. Hereinafter, with reference to FIGS. 1 and 2, the configuration and effects of the liquefied hydrogen storage tank according to the present disclosure will be described.

The liquefied hydrogen storage tank 10 according to the present disclosure includes a first tank unit 100 and a second tank unit 200 and 300.

The first tank unit 100 preferably has a doughnut shape having a hollow part h formed therein. The first tank unit 100 has a predetermined thickness and stores liquefied hydrogen 1 therein. As an example, a valve (not shown) may be formed in order to allow the inflow and outflow of liquefied hydrogen 1.

The second tank unit 200 and 300 preferably has a doughnut shape in which a hollow part h is formed. Additionally, the second tank unit 200 and 300 has a refrigerant stored therein. At this time, since a structure in which the second tank unit 200 and 300 surrounds the first tank unit 100 is formed, the refrigerant stored in the second tank unit 200 and 300 enables the temperature of liquefied hydrogen 1 to be maintained to a certain temperature or lower through heat exchange with liquefied hydrogen 1 stored in the first tank unit 100.

As an example, a valve (not shown) may be formed in order to allow the inflow and outflow of the refrigerant.

The second tank unit is divided into a 2-1 tank unit 200 and a 2-2 tank unit 300. The 2-1 tank unit 200 has a shape that surrounds the outer surface of the first tank unit 100 from the upper portion, and the 2-2 tank unit 300 has a shape that surrounds the outer surface of the first tank unit 100 from the lower portion.

At this time, preferably based on a virtual plane formed by the longitudinal direction and width direction including the central part of the first tank unit 100, the 2-1 tank unit 200 is desirably located at the upper portion of the virtual plane, and the 2-2 tank unit 300 is desirably located at the lower portion of the virtual plane.

Hereinafter, the 2-1 tank unit 200 will be described in detail.

The 2-1 tank unit 200 is formed with a hollow part h, and includes a 2-1 inner wall 210, a 2-1 outer wall 230, a 2-1 vacuum wall 220, and a 2-1 support wall 240.

The 2-1 inner wall 210 is preferably recessed along the shape of the outer surface of the first tank unit 100. As an example, a groove with a half-moon cross sectional shape is formed. Due to this, the first tank unit 100 and the 2-1 inner wall 210 are brought into close contact to have an effect of strengthening the coupling between the first tank unit 100 and the 2-1 tank unit 200, and since the contact area is maximized, there is an advantage in that the heat exchange efficiency between the refrigerant and liquefied hydrogen 1 is increased.

The 2-1 outer wall 230 constructs the outer surface of the 2-1 tank unit 200, and is preferably rounded. At this time, the 2-1 support wall 240 is formed between the 2-1 inner wall 210 and the 2-1 outer wall 230. The 2-1 support wall 240 is in contact with a 2-2 support wall 340, which will be described later, and the content regarding this will be described in detail later.

The 2-1 vacuum wall 220 is formed to be spaced apart from the 2-1 outer wall 230 at a predetermined distance in the direction of the 2-1 inner wall 210, and the 2-1 vacuum wall 220 may be constructed through a support member that has not been shown.

At this time, a space is formed between the 2-1 vacuum wall 220 and the 2-1 outer wall 230, and a vacuum is formed in the corresponding space so that a vacuum layer is preferably formed in the liquefied hydrogen storage tank according to the present disclosure. Due to this, the storage tank should be constructed as thick as the space formed by the 2-1 outer wall 230 and the 2-1 vacuum wall 220, but since the thickness of the 2-1 outer wall 230 and the 2-1 vacuum wall 220 is reduced, and a vacuum layer is formed in the corresponding space, the cost required to manufacture the storage tank (e.g., steel cost) can be reduced. In addition, the weight of the storage tank can be reduced by about 1/10 compared to the existing one, which has the advantage of maximizing the transportation efficiency of the liquefied hydrogen storage tank and increasing safety.

Due to the configuration of the 2-1 inner wall 210, the 2-1 vacuum wall 220, and the 2-1 support wall 240, a space 2*a* is formed inside, and the refrigerant may be stored in the corresponding space 2*a*.

Hereinafter, the 2-2 tank unit 300 will be described in detail.

The 2-2 tank unit 300 is formed with a hollow part h, and includes a 2-2 inner wall 310, a 2-2 outer wall 330, a 2-2 vacuum wall 320, and a 2-2 support wall 340.

The 2-2 inner wall 310 is preferably recessed along the shape of the outer surface of the first tank unit 100. As an example, a groove with a half-moon cross sectional shape is formed. Due to this, the first tank unit 100 and the 2-2 inner wall 310 are brought into close contact to have an effect of strengthening the coupling between the first tank unit 100 and the 2-2 tank unit 300, and there is an advantage in that the heat exchange efficiency between the refrigerant and liquefied hydrogen 1 is increased.

Since a structure in which the above-described 2-1 inner wall 210 and 2-2 inner wall 310 surround the entire outer surface of the first tank unit 100 is formed, the heat exchange area is increased so that the heat exchange efficiency between the refrigerant and liquefied hydrogen 1 is maximized. Therefore, there is an advantage in that it can solve the problem of non-uniformity in which the temperature of liquefied hydrogen located at a specific point in a conventional hydrogen tank is not easy to maintain.

The 2-2 outer wall 330 constructs the outer surface of the 2-2 tank unit 300, and is preferably rounded. At this time, the 2-2 support wall 340 is formed between the 2-2 inner wall 310 and the 2-2 outer wall 330. The 2-2 support wall 340 comes into contact with the above-described 2-1 support wall 240.

The 2-2 vacuum wall 320 is formed to be spaced apart from the 2-2 outer wall 330 at a predetermined distance in the direction of the 2-2 inner wall 310, and the 2-2 vacuum wall 320 may be constructed through a support member that has not been shown.

At this time, a space is formed between the 2-2 vacuum wall 320 and the 2-2 outer wall 330, and a vacuum is formed in the corresponding space so that a vacuum layer is preferably formed in the liquefied hydrogen storage tank according to the present disclosure. Due to this, the storage tank should be constructed as thick as the space formed by the 2-2 outer wall 330 and the 2-2 vacuum wall 320, but since the thickness of the 2-2 outer wall 330 and the 2-2 vacuum wall 320 is reduced, and a vacuum layer is formed in the corresponding space, the cost required to manufacture the storage tank can be reduced, and the weight of the storage tank can be reduced at the same time so that there is an advantage of maximizing transportation efficiency of the liquefied hydrogen storage tank.

Accordingly, a structure is formed in which a vacuum layer is formed at the outermost part of the second tank unit 200 centering around the first tank unit 100.

Due to the configuration of the 2-2 inner wall 310, the 2-2 vacuum wall 320, and the 2-2 support wall 340, a space 2*b* is formed inside, and the refrigerant may be stored in the corresponding space 2*b*.

Accordingly, a structure is formed in which the refrigerant stored in the spaces 2*a* and 2*b* surrounds liquefied hydrogen 1 stored in the first tank unit 100 centering around the first tank unit 100.

Accordingly, summarizing the above-described configuration, since the storage tank storing liquefied hydrogen 1 has a doughnut shape with a hollow part h, there is an effect of improving the transportability of the storage tank. First of all, since the absolute volume can be reduced compared to conventional transport tanks, there are advantages of reducing the costs and increasing the transportation convenience.

Figure 8:
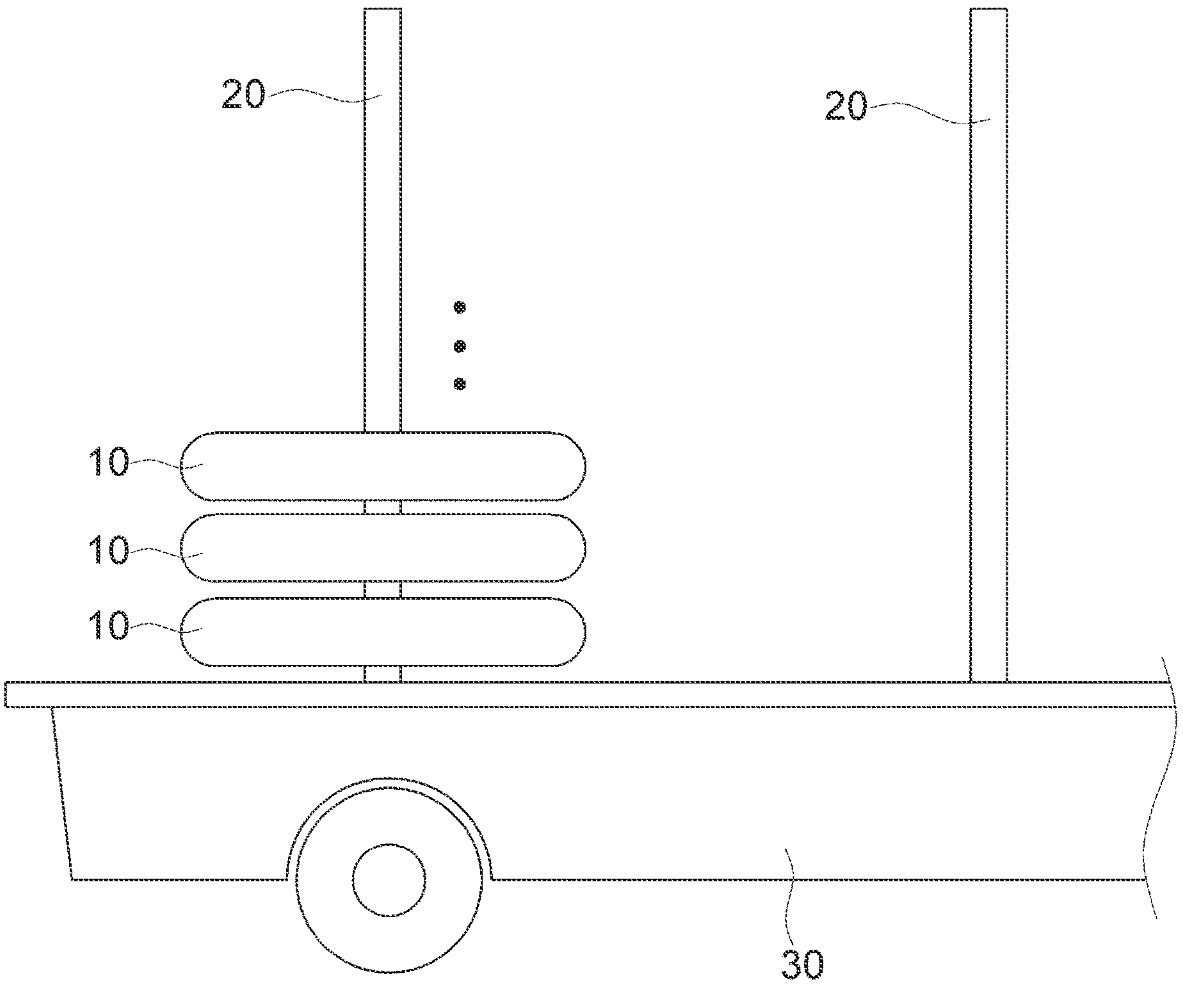
FIG. 8 shows an example of transportation of the liquefied hydrogen storage tank according to the present disclosure.

In addition, as an example, FIG. 8 shows an example of transportation of the liquefied hydrogen storage tank according to the present disclosure. As shown in FIG. 8, if a plurality of the bars are inserted so that a bar 20 formed at one point of a transportation mechanism 30 penetrates the hollow part h of the liquefied hydrogen storage tank, since the liquefied hydrogen storage tank is supported by the bars 20 during transportation, there is an advantage in that the transportation safety is maximized.

In addition, since there is no need to implement a separate device for fixing the liquefied hydrogen storage tank, transportation costs can be reduced, and since transportation of the liquefied hydrogen storage tank can be performed only by an operation of inserting the bars 20 into the liquefied hydrogen storage tank and removing the bars 20 therefrom, there is an advantage in that the work convenience is maximized.

In one embodiment, there is a limitation in that the refrigerant storage space 2*a* of the 2-1 tank unit 200 and the refrigerant storage space 2*b* of the 2-2 tank unit 300 are not each mutually exchanged by the 2-1 support wall 240 and the 2-2 support wall 340. Accordingly, in another embodiment of the present disclosure, the heat exchange efficiency between the refrigerant and liquefied hydrogen 1 can be maximized by allowing the refrigerants stored in the respective refrigerant storage spaces to circulate through mutual exchange.

Figure 3:
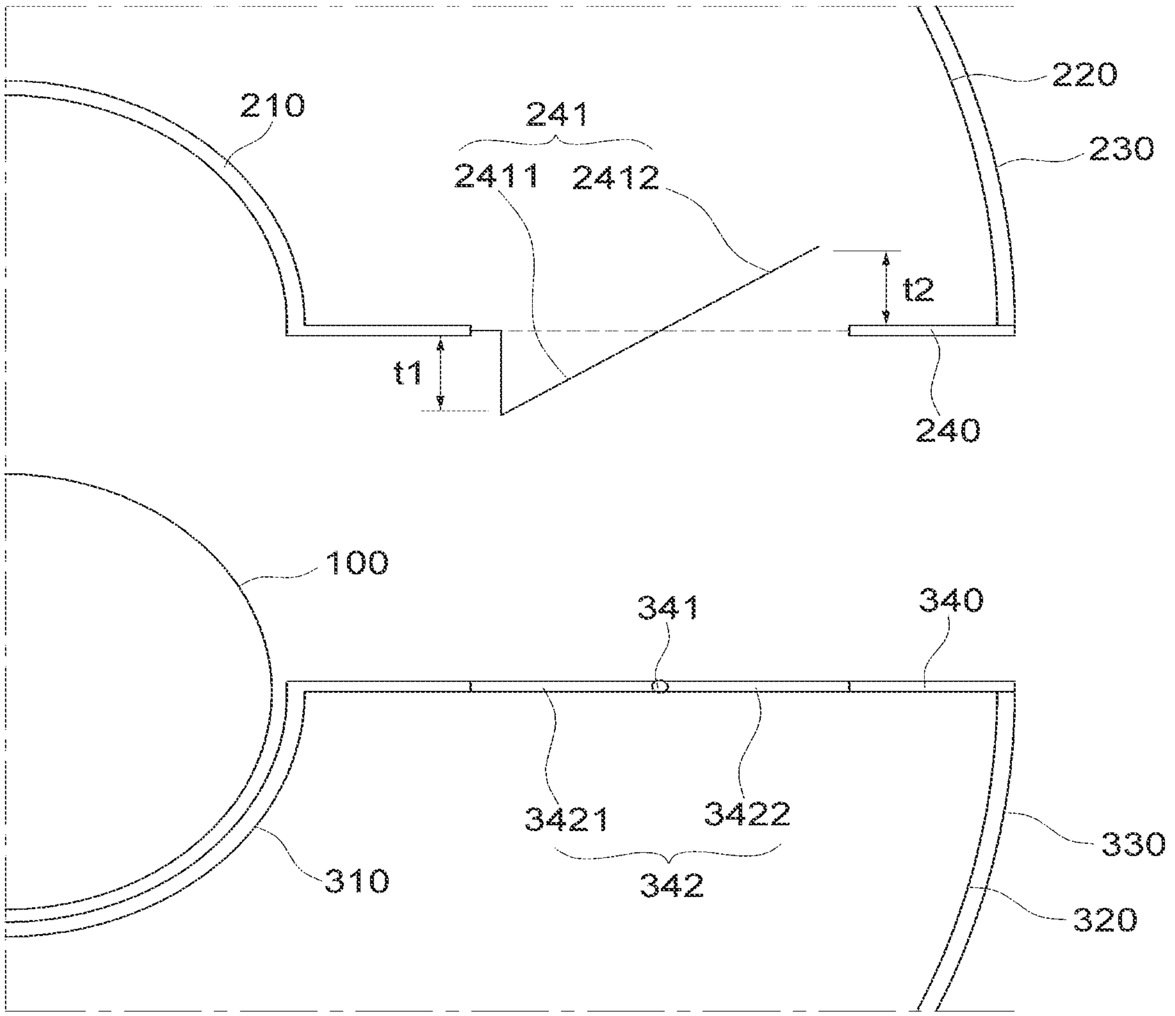
FIGS. 3 to 5 are views for explaining the coupling structure of the 2-1 tank unit and the 2-2 tank unit of a liquefied hydrogen storage tank according to another embodiment of the present disclosure.
Figure 4:
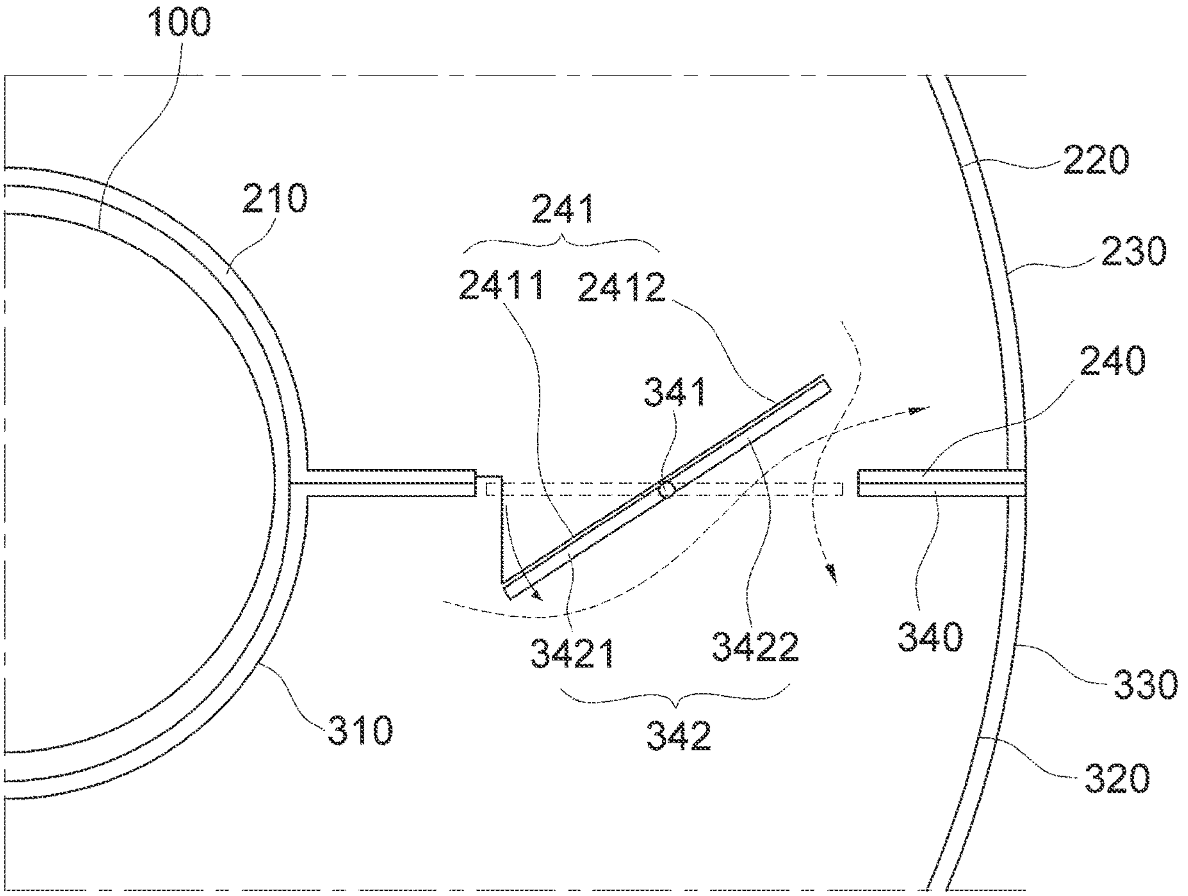
Figure 5:
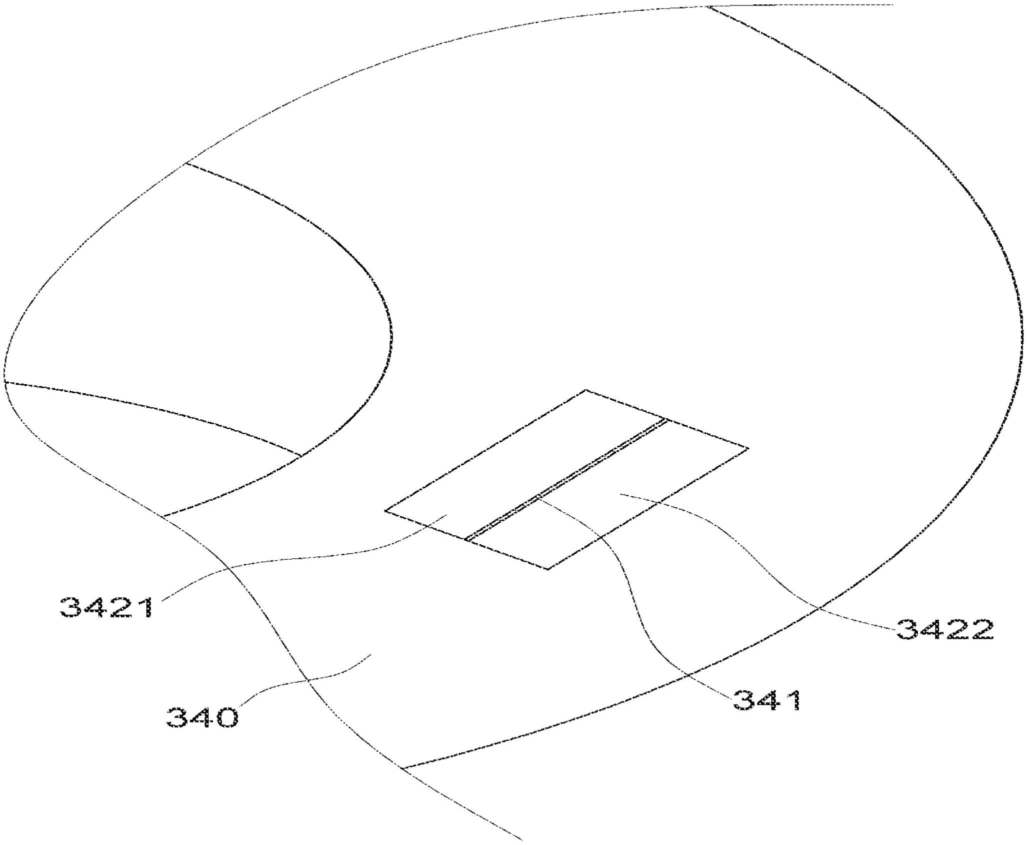

Hereinafter, a liquefied hydrogen storage tank according to another embodiment of the present disclosure will be described. FIGS. 3 to 5 are views for explaining the coupling structure of the 2-1 tank unit and the 2-2 tank unit of a liquefied hydrogen storage tank according to another embodiment of the present disclosure.

The liquefied hydrogen storage tank according to another embodiment of the present disclosure includes all the configurations of the liquefied hydrogen storage tank according to one embodiment, and further includes the configuration of a pressurizing part 241 and tilting parts 341 and 342.

The pressurizing part 241 is formed in the 2-1 tank unit 200, and the tilting parts 341 and 342 are formed in the 2-2 tank unit 300. Additionally, pluralities of pressurizing parts 241 and tilting parts 341 and 342 may be formed.

First, the pressurizing part 241 will be described. The pressurizing part 241 is formed at one point of the 2-1 support wall 240 of the 2-1 tank unit 200.

One end portion of the pressurizing part 241 protrudes downward to have a predetermined height t1 in the vertical direction from one point of the 2-1 support wall 240, and the entire pressurizing part 241 has a predetermined slope, and thus the other end portion, which is opposite to the protruding one end portion, is preferably located in the space 2*a* where the refrigerant of the 2-1 tank unit 200 is stored. In FIG. 3, for convenience of explanation, the pressurizing part located at the lower portion of the 2-1 support wall is denoted by reference numeral '2411', and the pressurizing part located at the upper portion thereof is denoted by reference numeral '2412'.

At this time, the other end portion, which is opposite to the protruding one end portion, protrudes upward to have a predetermined height t2 in a direction perpendicular to the 2-1 support wall 240 of the 2-1 tank unit 200. At this time, it is preferable that one end portion of the pressurizing part 241 is formed to extend with the 2-1 support wall 240, and it is preferable that the other end portion of the pressurizing part 241 is not formed to extend with the 2-1 supporting wall 240 to form a hollow part. Due to this, the hollow part between the other end portion of the pressurizing part 241 and the 2-1 support wall 240 serves as a flow path through which the refrigerant can circulate. The content regarding this will be described in detail later.

Next, the tilting parts 341 and 342 will be described. The tilting parts 341 and 342 are formed at one point of the 2-2 support wall 340 of the 2-2 tank unit 300, and a hollow part is formed at one point, and thus the tilting parts 341 are 342 are located in the corresponding hollow part. As an example, the tilting parts 341 and 342 may be configured in the form as shown in FIG. 5.

At this time, the tilting parts 341 and 342 are composed of a rotation shaft 341 and a wing 342. The rotation shaft 341 is formed to extend in a plane direction consisting of the longitudinal direction and the width direction, and the wing 342 is coupled thereto. The wing 342 is preferably formed in a pair 3421 and 3422, and the pair of wings 3421 and 3422 are coupled to both sides of the rotation shaft 341. A structure in which the wing 342 is capable of tilting centering around the rotation shaft 341 is formed.

Before coupling the 2-1 tank unit 200 and the 2-2 tank unit 300, the cross section of the storage tank is formed as shown in FIG. 3, and when the 2-1 support wall 240 and the 2-2 support wall 340 come into contact with each other by coupling the 2-1 tank unit 200 and the 2-2 tank unit 300, a cross section of the storage tank in the form as shown in FIG. 4 is formed.

When the 2-1 tank unit 200 descends while surrounding the first tank unit 100 in order for the 2-1 tank unit 200 to be coupled to the 2-2 tank unit 300, the protruding one end portion of the pressurizing part 241 and the pressurizing part 2411 near it pressurize the vertically facing wing (reference numeral of 3421 based on FIG. 4) of the pair of wings, and the wing 3421 is tilted into the space 2*b* which is formed in the 2-2 tank unit 300, and in which the refrigerant is stored.

In contrast, the remaining wing (reference numeral of 3422 based on FIG. 4) is tilted into the space 2*a* which is formed in the 2-1 tank unit 200, and in which the refrigerant is stored.

At this time, the wing 3422 is supported by the pressurizing part 2412 near the other end portion of the pressurizing part 241, and a structure that can prevent problems such as narrowing of the flow path due to limited upward tilting movement is formed.

Due to the operation as described above, a structure in which the 2-2 support wall 340 and the 2-1 support wall 240 communicate with each other, and a flow path is formed to enable the refrigerant to circulate through both of the refrigerant storage spaces 2*a* and 2*b* formed in the 2-1 tank unit 200 and the 2-2 tank unit 300 is formed. Therefore, the heat exchange efficiency is increased. At this time, it is preferable for the operator to input the refrigerant after coupling the 2-1 tank unit 200 and the 2-2 tank unit 300.

In the present disclosure, since the 2-1 tank unit 200 and the 2-2 tank unit 300 are separately separated, and have a structure in which they are coupled to each other while surrounding the first tank unit 100, there is a structural limitation in that the refrigerant flow paths cannot communicate with each other from even before coupling. However, after coupling, the pressurizing part 241 pressurizes the tilting parts 341 and 342 to form a flow path so that the refrigerant can circulate therethrough, and at the same time, the 2-1 support wall 240 and the 2-2 support wall 340 are in contact with each other in the other parts, and thus there is an advantage of securing the airtightness so that leakage of the refrigerant can be minimized.

In addition, there is an advantage of improving work convenience since a flow path is formed only by bringing the 2-1 tank unit 200 and the 2-2 tank unit 300 into contact even without separate work by the operator to secure the flow path.

In addition, since the operator can assemble the hydrogen tank only by disposing the 2-2 tank unit 300, disposing the first tank unit 100, and then disposing the 2-1 tank unit 200 on the upper portion of the 2-2 tank unit 300, there is an advantage in that assembly easiness is improved, and there is an advantage in that disassembly is also easy.

Figure 6:
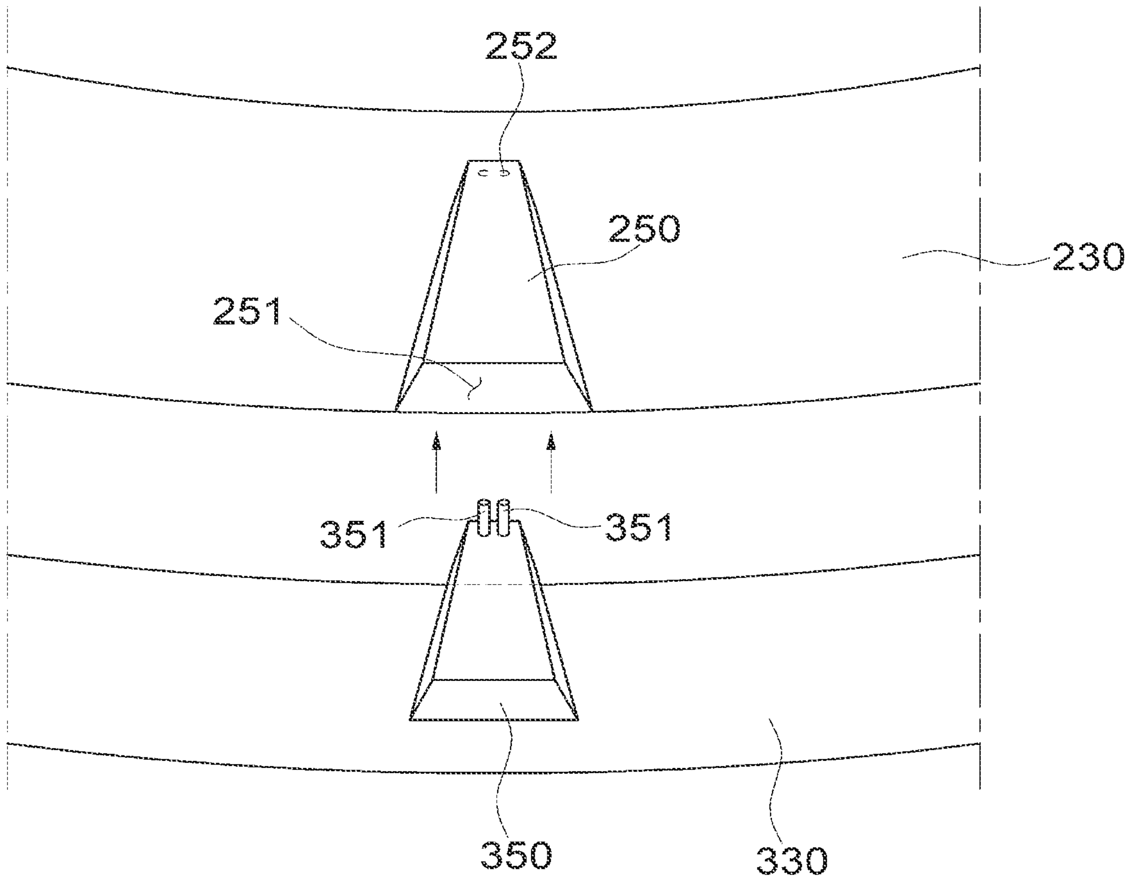
FIGS. 6 and 7 are views for explaining the structure of the accommodation unit and the fixing unit according to the present disclosure.
Figure 7:
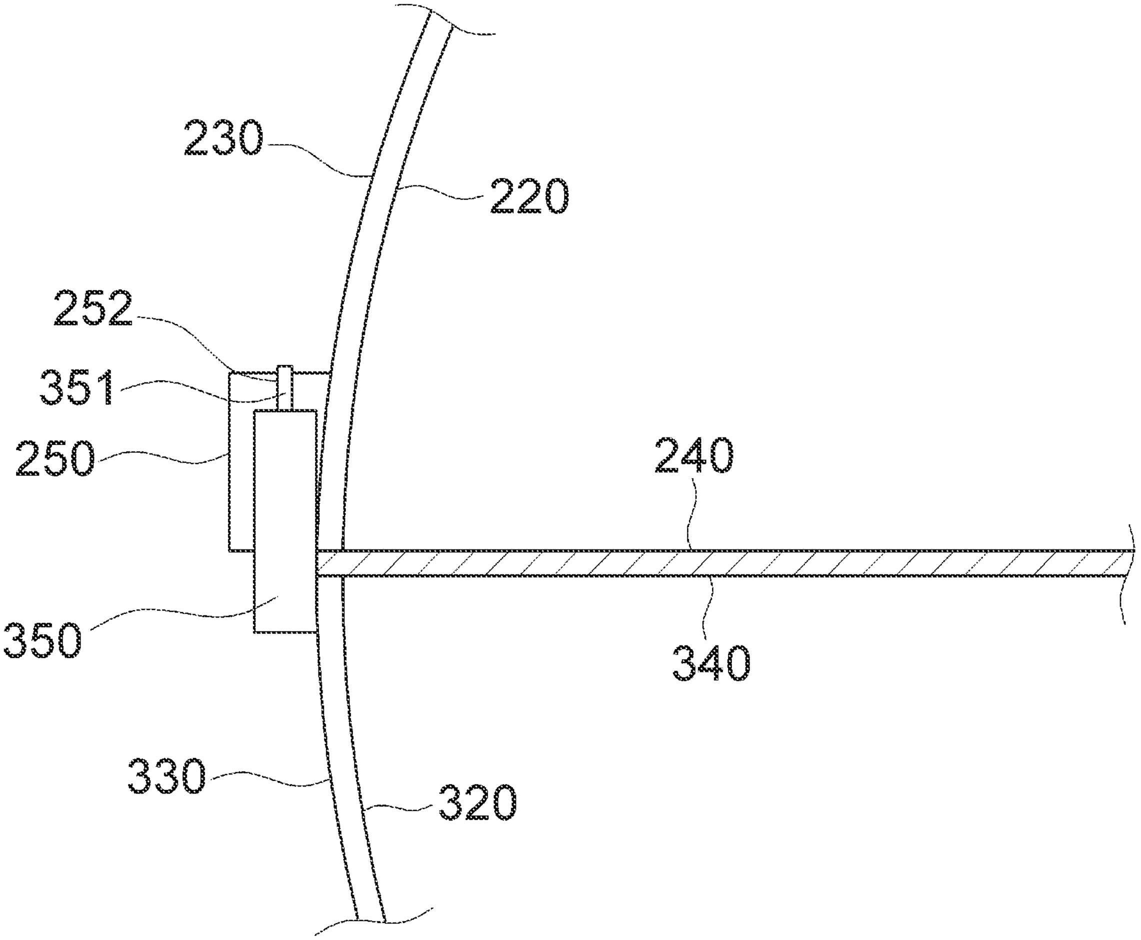

FIGS. 6 and 7 are views for explaining the structure of the accommodation unit and the fixing unit according to the present disclosure.

The accommodation unit 250 is formed at one point on the outer surface of the 2-1 tank unit 200. It is formed by protruding from one point on the outer surface of the 2-1 tank unit 200, and a groove 251 is formed therein. Additionally, a hole 252 is formed at one point on the upper side of the accommodation unit 250, and is preferably formed in a pair.

The fixing unit 350 is formed at one point on the outer surface of the 2-2 tank unit 300. It is preferable that it is formed to extend in the vertical direction and a pin 351 is formed at the upper end portion. Additionally, the pin 351 is preferably formed in a pair.

At this time, when the 2-1 tank unit 200 and the 2-2 tank unit 300 come into contact with each other, it is preferable that the fixing unit 350 is positioned to be inserted into the accommodation unit 250. In addition, when the fixing unit 350 is inserted into the groove 251 formed in the accommodation unit 250, it is preferable that the pin 351 formed in the fixing unit 350 is inserted into and penetrates the hole 252 formed in the accommodation unit 250 (see FIG. 7).

Due to the structure as described above, when the 2-1 tank unit 200 and the 2-2 tank unit 300 are coupled, there is an advantage in that the coupling becomes strengthened. In particular, since the fixing unit 350 is inserted into the accommodation unit 250 so that it is primarily fixed, and at the same time a secondary fixation in which the pin 351 is inserted into the groove 251 is achieved, there is an advantage of imparting a multistage fixing effect.

Figure 9:
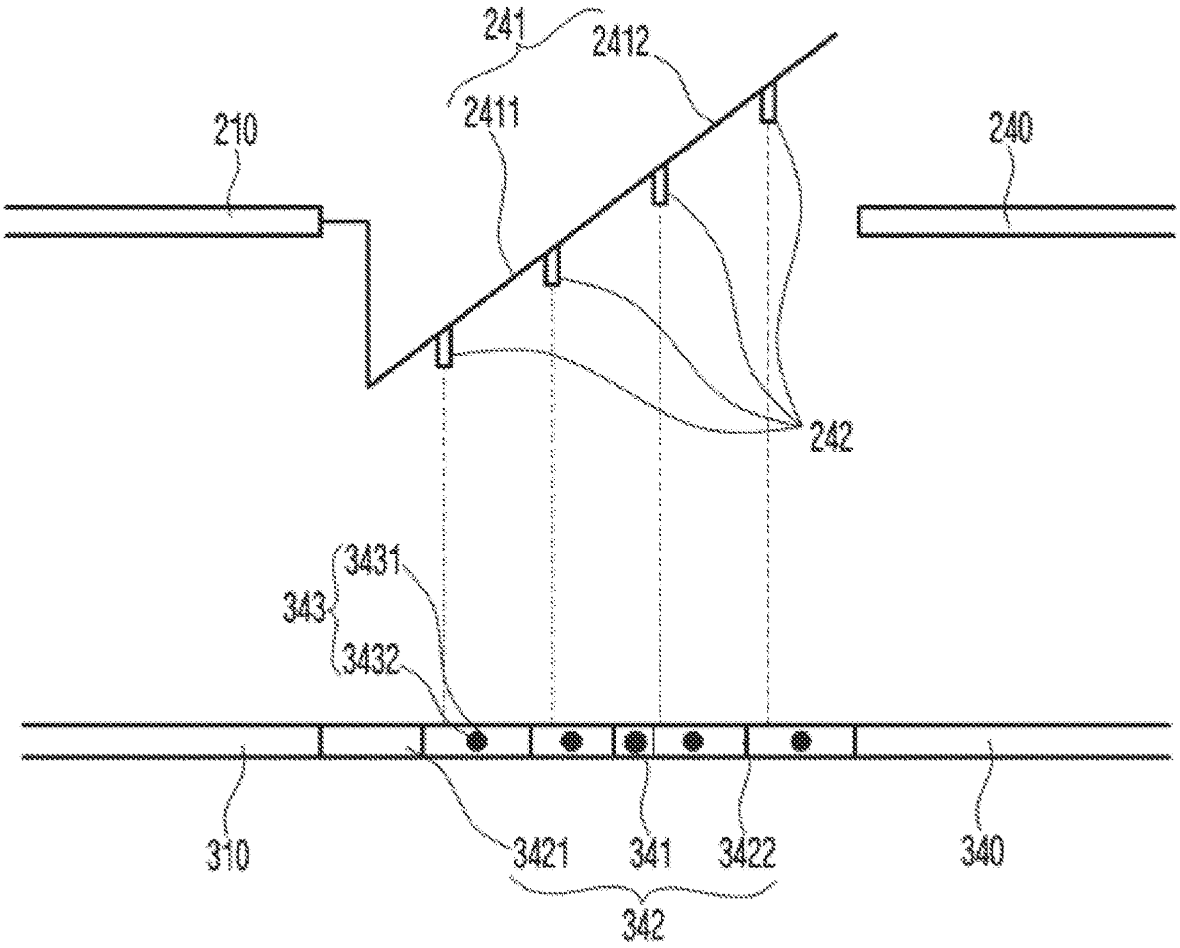
FIG. 9 is an enlarged view of the tilting part and the pressurizing part according to the third embodiment of the present disclosure.

FIG. 9 is an enlarged view of the tilting part and the pressurizing part according to the third embodiment of the present disclosure. Hereinafter, with reference to FIG. 9, the configurations and effects of the tilting part and the pressurizing part according to the third embodiment of the present disclosure will be described.

In the third embodiment of the present disclosure, a pressurizing pin 242 and an auxiliary tilting part 343 are additionally formed.

The pressurizing pin 242 is formed at the lower portion of the pressurizing part 241. More specifically, the pressurizing pin 242 is preferably formed to extend downward in the vertical direction from the inclined surface of the pressurizing part 241. In addition, as will be described later, it is preferable that the pressurizing pin 242 is designed to contact one side of the auxiliary wing 3432 of the auxiliary tilting part 343 during descending.

Additionally, it is preferable that a plurality of pressurizing pins 242 are formed. The plurality of pressurizing pins 242 are formed longitudinally to be spaced apart at predetermined intervals along the inclined surface of the pressurizing part 241, and each of the auxiliary wing 3432 of the plurality of auxiliary tilting parts 343 to be described later is pressurized.

The auxiliary tilting part 343 is preferably formed in the tilting parts 341 and 342 so that it is tilted independently of the tilting parts 341 and 342 in the tilting parts 341 and 342 described above.

The auxiliary tilting part 343 preferably includes an auxiliary rotation shaft 3431 and an auxiliary wing 3432. The auxiliary wing 3432 is preferably formed in a pair 3432*a* and 3432*b*, and a pair of auxiliary wings 3432*a* and 3432*b* are coupled to both sides of the auxiliary rotation shaft 3431. A structure in which the auxiliary wing 3432 is capable of tilting centering around the auxiliary rotation shaft 3431 is formed.

A plurality of auxiliary tilting parts 343 are preferably formed in the tilting parts 341 and 342, and each is preferably designed to contact the pressurizing pin 242 described above. More specifically, it is preferable that the pressurizing pin 242 and the auxiliary tilting part 343 corresponding thereto are located on an extension line in the vertical direction, and it is preferable that any one auxiliary wing out of a pair of auxiliary wings 3432 of any one auxiliary tilting part 343 comes into contact with the pressurizing pin 242. Due to this structure, when the pressurizing pin 242 descends and comes into contact with the auxiliary tilting part 343, a structure in which the entire auxiliary wing 3432 can be tilted centering around the auxiliary rotation shaft 3431 of the auxiliary tilting part 343 is formed.

Figure 10:
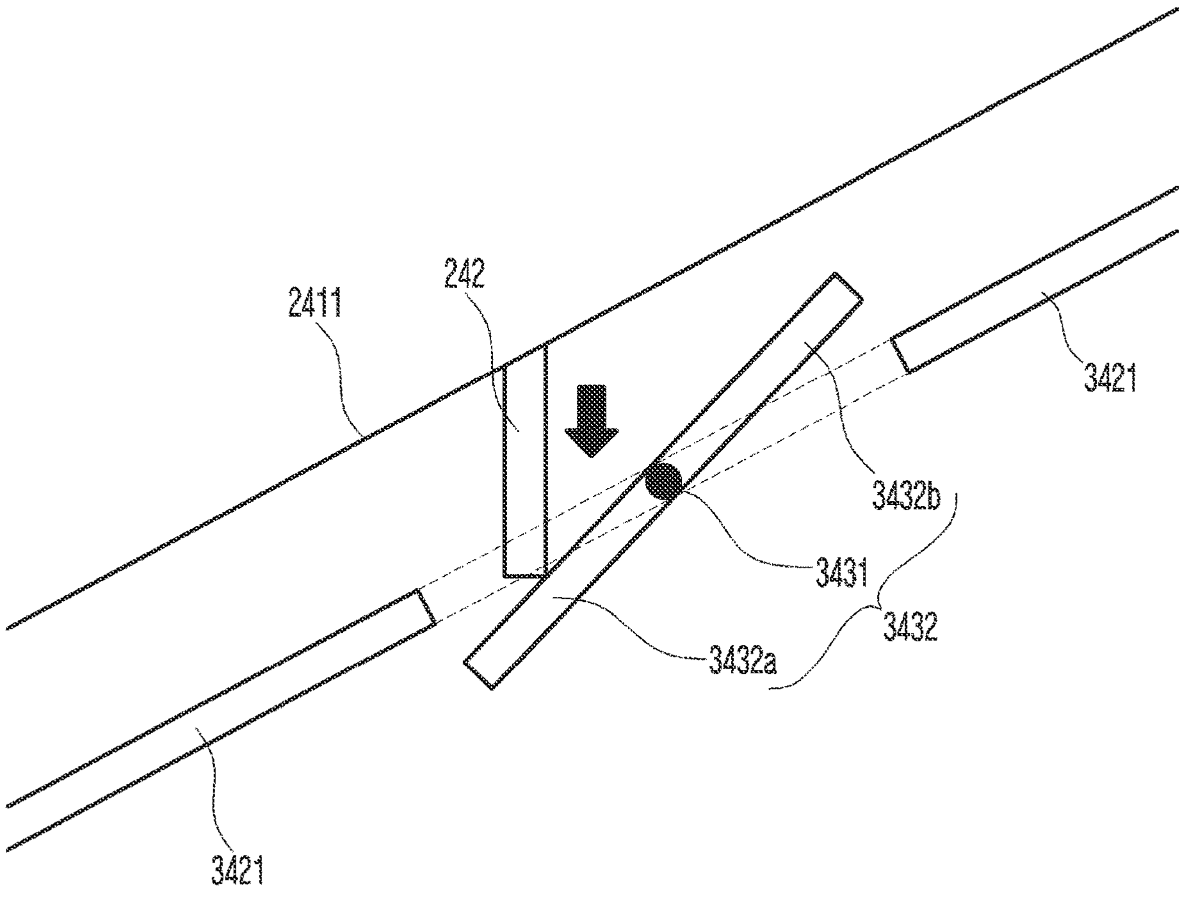
FIGS. 10 and 11 show a process in which the pressurizing pin according to a third embodiment of the present disclosure pressurizes the auxiliary tilting part.
Figure 11:
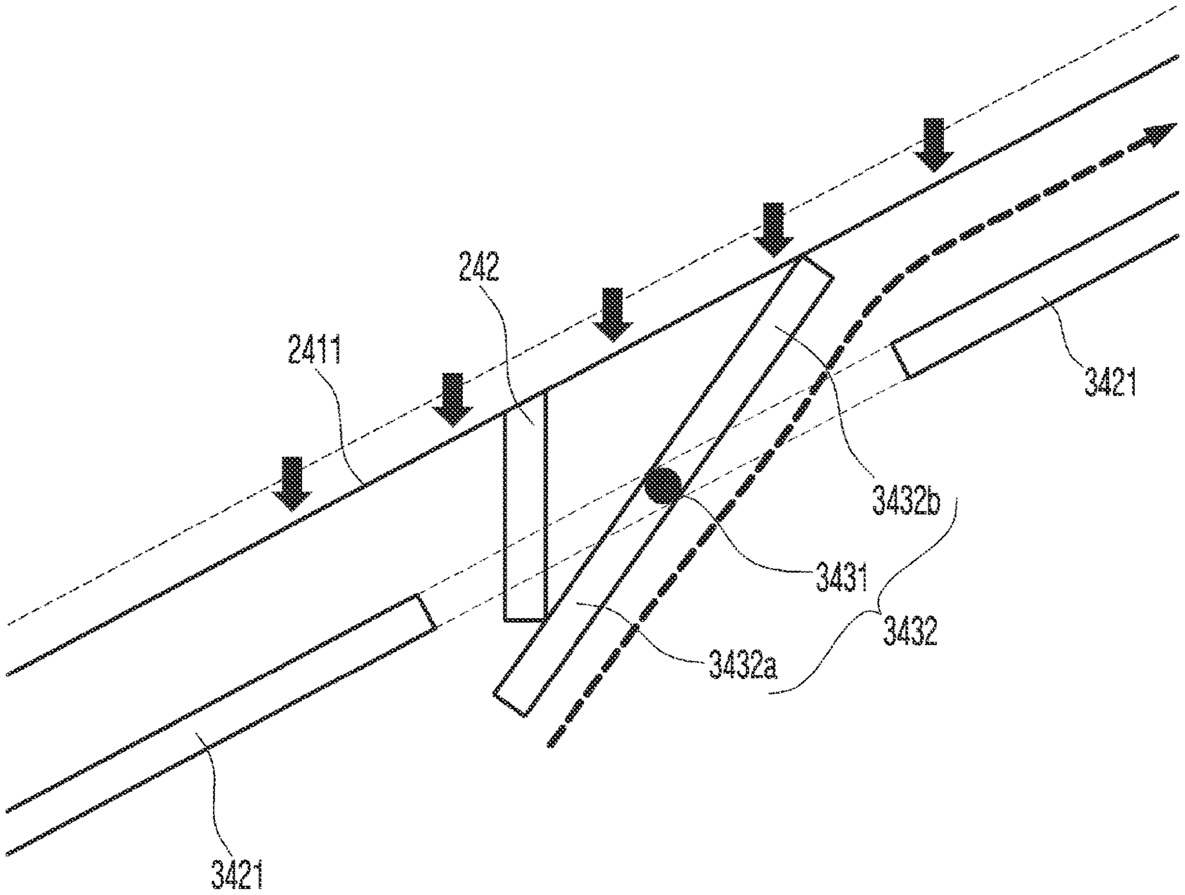

FIGS. 10 and 11 show a process in which the pressurizing pin according to a third embodiment of the present disclosure pressurizes the auxiliary tilting part.

At this time, the lowermost end point in the vertical direction where the inclination of the pressurizing part 241 begins is preferably located lower than the plurality of pressurizing pins 242 in the vertical direction. Accordingly, when the pressurizing part 241 descends as the 2-1 tank unit descends, the pressurizing part 241 first comes into contact with the wing 3421 of the tilting parts 341 and 342 before the pressurizing pins 242 comes into contact with the auxiliary tilting part 343, and due to this, the entire tilting parts 341 and 342 rotate around the rotation shaft 341 and then the pressurizing pins 242 come into contact with the auxiliary tilting part 343.

Since the auxiliary tilting part 343 can be smoothly tilted by the pressurizing pins 242 only when the auxiliary tilting part 343 is tilted after the entire tilting parts 341 and 342 rotate, the entire tilting structure of the third embodiment can be completed.

As shown in FIG. 10, in a state in which the wing 3421 is tilted, the pressurizing pins 242 pressurize one auxiliary wing 3432*a* of a pair of auxiliary wings 3432 of the auxiliary tilting part 343, and as shown in FIG. 10, the entire auxiliary wing 3432 tilts centering around the auxiliary rotation shaft 3431.

When referring to FIG. 11, an additional flow path is formed between the pressurizing part 241 and the tilting parts 341 and 342 unlike other embodiments due to this tilting. The refrigerant can circulate between the 2-1 tank unit and the 2-2 tank unit through the additionally formed flow path, and thus there is an advantage in that the refrigerant circulation efficiency is maximized compared to other embodiments.

At this time, the auxiliary wing 3432*b*, which is not in contact with the pressurizing pins 342, is supported in contact with the inclined surface of the pressurizing part 241, and due to the formation of this support structure, a gap between the auxiliary wing 3432*b* and the wing 3421 of the tilting part can be maintained. In other words, the refrigerant circulation efficiency can be improved by continuously forming a flow path without closing the gap.

Figure 12:
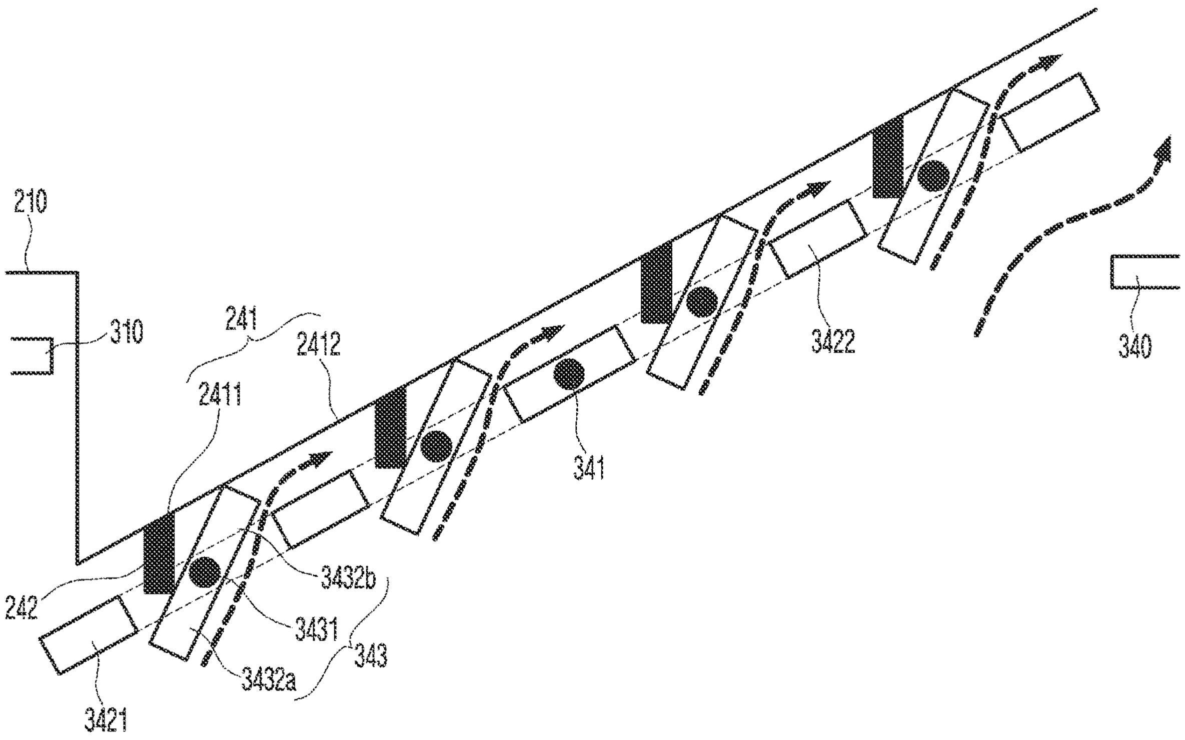
FIG. 12 shows a tilted shape of the entire auxiliary tilting part according to the third embodiment of the present disclosure.

At this time, the inclination of the pair of auxiliary wings 3432 and the wing 342 of the tilting part is expressed as shown in FIGS. 10 to 12 for convenience of explanation, and there may be some differences from the inclination when actually coupled.

FIG. 12 shows a tilted shape of the entire auxiliary tilting part according to the third embodiment of the present disclosure, and as shown, an additional flow path is formed in addition to the flow path according to another embodiment so that the refrigerant circulation efficiency is maximized. At this time, the length of the pressurizing pins shown in FIG. 12 is expressed somewhat differently from the length of the pressurizing pin in FIGS. 10 and 11, but this is for convenience of explanation.

Figure 13:
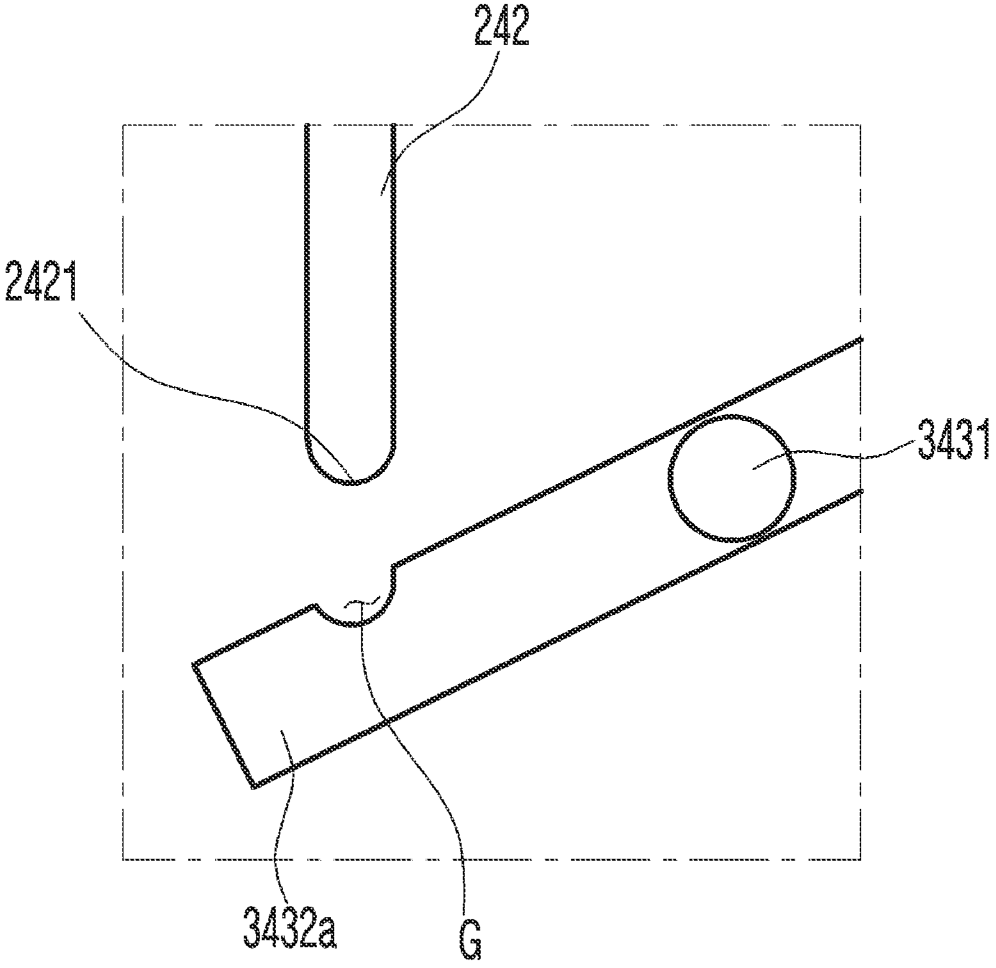
FIG. 13 is an enlarged view of the pressurizing pin and the auxiliary tilting part according to a fourth embodiment of the present disclosure.

FIG. 13 is an enlarged view of the pressurizing pin and the auxiliary tilting part according to a fourth embodiment of the present disclosure. The fourth embodiment includes all the configurations of the third embodiment, but the shape of the pressurizing pin 242 and the auxiliary tilting part 343 is partially changed.

According to the fourth embodiment, it is preferable that a rounded portion 2421 is formed at the lower end portion of the pressurizing pin 242, and it is preferable that a round recessed groove G is formed in one auxiliary wing 3432*a* of a pair of auxiliary wings 3432 of the auxiliary tilting part 343 of a position facing this. When the pressurizing pin 242 descends in the vertical direction and comes into contact with the recessed groove G, the pair of auxiliary wings 3432 tilt centering around the auxiliary rotation shaft 3431. At this time, due to the structure in which the lower end portion of the pressurizing pin 242 is accommodated in the recessed groove G, a problem in which the pressurizing pin 242 is slipped from the auxiliary wing 3432*a* so that tilting is not smoothly performed can be prevented, and wear can be minimized through the rounded shape so that there is an advantage in that the lifespan is extended.

According to the fifth embodiment of the present disclosure, it is preferable that a heat insulation coating layer is formed on the outer surface of the second tank unit 200 and 300. Due to this, there is an advantage in that the insulation effect is maximized compared to the use of conventional insulation materials.

Preferably, the surface of the second tank unit 200 and 300 is coated with a heat insulating coating composition containing an aqueous solvent, a polymer resin, an aerogel, a compound represented by the following formula 1, and a compound represented by the following formula 2:

[Formula 1]

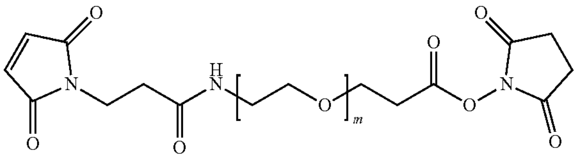

[Formula 2]

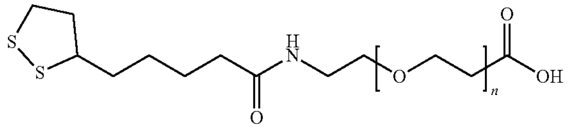

where, m and n are the same or different from each other and are each independently an integer of 1 to 20.

Specifically, the aqueous solvent may be selected from the group consisting of methyl alcohol, ethyl alcohol, propyl alcohol, n-butyl alcohol, iso-butyl alcohol, tert-butyl alcohol, water, ethyl acetate, and mixtures thereof.

Meanwhile, the polymer resin may be selected in consideration of the physical properties required for the heat insulation coating layer finally prepared, specific examples of the polymer resin may be selected from the group consisting of polyimide, polyamideimide, silicone resin, polyamide, polytetrafluoroethylene, polyethylenenitrile, polyethersulfone, poly(meth)acrylate, and mixtures thereof, and the polymer resin has a weight average molecular weight of 3,000 to 300,000. More specifically, the polymer resin may be dispersed in the aqueous solvent.

Meanwhile, the aerogel may use previously known conventional aerogels, and more specifically, may include a compound selected from the group consisting of silicon oxide, carbon, polyimide, metal carbide, and mixtures thereof, and the aerogel may have a specific surface area of 100 $cm^3/g$ to 1,000 $cm^3/g$.

Specifically, when the heat insulation coating composition includes the compound represented by Formula 1 above and the compound represented by Formula 2 above, the compatibility and dispersibility of the polymer resin and aerogel in the heat insulation coating composition are improved so that the heat insulation coating layer finally formed may exhibit uniform physical properties. Furthermore, as the aerogel is uniformly dispersed in the polymer resin, the heat insulation coating layer formed from the heat insulation coating composition may achieve lower thermal conductivity and higher heat capacity to exhibit high thermal insulation performance as a result.

Furthermore, due to the specific functional groups contained in the compounds represented by Formula 1 and Formula 2 above, the heat insulation coating layer formed from the heat insulation coating composition of the present disclosure may not only exhibit excellent mechanical strength and heat resistance, but also may exhibit high adhesive force to a second tank unit 200 and 300.

More preferably, the heat insulation coating composition may contain 40 to 60 parts by weight of a polymer resin, 40 to 60 parts by weight of an aerogel, 10 to 30 parts by weight of the compound represented by Formula 1, and 10 to 30 parts by weight of the compound represented by Formula 2 based on 100 parts by weight of an aqueous solvent.

In the case of the above weight ranges, the heat insulation properties and adhesive force of the coating layer formed of the heat insulation coating composition may be maximized due to the synergistic effect of mixing respective active components.

Meanwhile, if the respective active components are less than or exceed the weight ranges, the desired effect may be minimal.

Preparation Example

Preparation of Heat Insulation Coating Compositions

A porous silica aerogel (specific surface area of about 500 $cm^3/g$) dispersed in ethyl alcohol, a silicone polymer resin dispersed in an aqueous solvent methyl ethyl ketone (MEK), a compound represented by Formula 1 below, and a compound represented by Formula 2 below were injected into a reactor, and mixed at a speed of 300 to 500 rpm at a temperature of about 60° C. and under normal pressure conditions using a mechanical stirrer device to prepare a heat insulation coating composition:

[Formula 1]

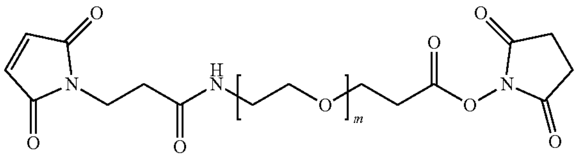

[Formula 2]

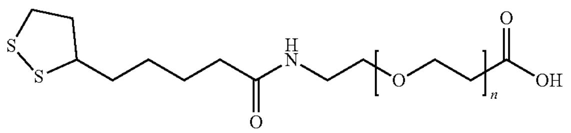

where, m is 6, and n is 12.

The weight ranges of the respective active components contained in the heat insulation coating composition are shown in Table 1 below.

TABLE 1

| | T1 | T2 | T3 | T4 | T5 |
|---|---|---|---|---|---|
| Aqueous solvent | 100 | 100 | 100 | 100 | 100 |
| Silicone resin | 35 | 40 | 50 | 60 | 65 |
| Porous silica aerogel | 35 | 40 | 50 | 60 | 65 |
| Compound represented by Formula 1 | 5 | 10 | 20 | 30 | 35 |
| Compound represented by Formula 2 | 5 | 10 | 20 | 30 | 35 |

(Unit: parts by weight)

Preparation of Heat Insulation Coating Layer

After the prepared heat insulation coating composition T1 was applied to a stainless steel specimen by a spray coating method and primary semi-drying was performed at 150° C. for 10 minutes, the heat insulation coating composition T1 was reapplied and secondary semi-drying was performed at 150° ° C. for 10 minutes. After the secondary drying, the heat insulation coating composition T1 was applied again, and complete drying was performed at 250° C. for 60 minutes to form a heat insulation coating layer (Example 1).

The above-mentioned T2 to T5 were coated in the same manner as above to form the heat insulation coating layers of Examples 2 to 5, respectively.

Experimental Example

1) Measurement of Thermal Conductivity

For the stainless steel specimens on which the heat insulation coating layer was formed, the thermal conductivities were measured by a thermal diffusion measurement method using a laser flash method under room temperature and normal pressure conditions in accordance with ASTM E1461.

2) Measurement of Heat Capacity

For the stainless steel specimens on which the heat insulation coating layer was formed, the heat capacities were confirmed by measuring the specific heats using sapphire as a reference using a DSC device under room temperature conditions in accordance with ASTM E1269.

3) Measurement of Peel Strength

The adhesive forces between the stainless steel specimens and the coating layer were evaluated by a method of scratching a thin film having a length of 10 mm while a load being applied thereto using an adhesion measuring device from CSM and using a fine needle in accordance with ISO 20502 standards.

The experimental results are shown in Table 2 below.

TABLE 2

| | Thermal conductivity of the coating layer (W/m) | Heat capacity of coating layer ($KJ/m^3K$) | Peel strength between specimen and coating layer (N) |
|---|---|---|---|
| Example 1 | 0.578 | 1001 | 8.7 |
| Example 2 | 0.333 | 1385 | 12.0 |
| Example 3 | 0.301 | 1401 | 18.7 |
| Example 4 | 0.374 | 1345 | 14.7 |
| Example 5 | 0.498 | 1044 | 9.7 |

When referring to Table 2, it can be confirmed that Examples 1 to 5 show relatively high heat capacities and low thermal conductivities, thereby having excellent thermal insulation performance. In addition, it can be confirmed that they have excellent adhesive forces by showing excellent peel strengths.

More specifically, it can be confirmed that the effects thereof are maximized in the case of Examples 2 to 4.

In addition, although preferred embodiments of the present disclosure have been shown and described above, the present disclosure is not limited to the specific embodiments described above, and it goes without saying that various modified implementations can be made by those skilled in the art to which the present disclosure pertains without departing from the gist of the present disclosure as claimed in the claims, and these modified implementations should not be understood individually from the technical idea or prospect of the present disclosure.

EXPLANATION OF REFERENCE NUMERALS

100: First tank unit,
200, 300: Second tank unit,
210: 2-1 inner wall,
220: 2-1 outer wall,
230: 2-1 vacuum wall,
240: 2-1 support wall,
241: Pressurizing part,
242: Pressurizing pin,
310: 2-2 inner wall,
320: 2-2 outer wall,
330: 2-2 vacuum wall,
340: 2-2 support wall,
341, 342: Tilting part,
343: Auxiliary tilting part.

What is claimed is:

1. A liquefied hydrogen storage tank, comprising:

a first tank unit having a first doughnut shape defining a first hollow part extending through a central region of the first doughnut shape; and a second tank unit having a second doughnut shape defining a second hollow part extending through a central region of the second doughnut shape, the second tank unit surrounding the first tank unit, wherein the first tank unit is configured to store liquefied hydrogen therein, wherein the second tank unit includes:

a 2-1 tank unit surrounding an outer surface of the first tank unit at an upper portion of the first tank unit; and a 2-2 tank unit surrounding the outer surface of the first tank unit at a lower portion of the first tank unit, wherein the liquefied hydrogen storage tank further comprises:

an accommodation unit positioned on an outer surface of the 2-1 tank unit and having a groove in the accommodation unit; and a fixing unit positioned on an outer surface of the 2-2 tank unit and configured to be inserted into the groove, wherein the accommodation unit has a hole positioned at an upper side of the accommodation unit, wherein the fixing unit has a protruding pin at an upper side of the fixing unit, and wherein the fixing unit is inserted into the accommodation unit, and the protruding pin is inserted into the hole.

2. The liquefied hydrogen storage tank of claim 1, wherein the second tank unit is configured to store a refrigerant therein.

3. The liquefied hydrogen storage tank of claim 1, wherein the second tank unit has a vacuum layer positioned on an inner side thereof.

* * * * *